United States Patent [19]

O'Donnell

[11] Patent Number: 4,488,434
[45] Date of Patent: Dec. 18, 1984

[54] PHASE INSENSITIVE DETECTOR FOR USE IN ULTRASONIC SCANNER AND METHOD

[75] Inventor: Matthew O'Donnell, Schenectady, N.Y.

[73] Assignee: General Electric Company, Milwaukee, Wis.

[21] Appl. No.: 494,339

[22] Filed: May 13, 1983

[51] Int. Cl.³ ............................................. G01N 29/04
[52] U.S. Cl. ........................................ 73/602; 73/625
[58] Field of Search ................. 73/602, 606, 625, 626, 73/628

[56] References Cited

U.S. PATENT DOCUMENTS 3,805,596  4/1974  Klahr ..................................... 73/602
4,325,257  4/1982  Kino et al. ............................ 73/626

OTHER PUBLICATIONS

"Response Characteristics of a Finite Aperture ..." by Busse & Miller from J. Acoustical Soc. of America, 70(5) Nov. 1981, pp. 1370–1376.
"A Comparison of Finite Aperture Phase ..." by Busse and Miller from 1981 Ultrasonics Symposium, pp. 617–626.
"Phase Insensitive Acoustoelectric Transducer" by Heyman from J. Acoustic Soc. of America, vol. 64, No. 1, Jul. 1978, pp. 243–249.

Primary Examiner—James J. Gill
Attorney, Agent, or Firm—Flehr, Hohbach, Test, Albritton & Herbert

[57] ABSTRACT

Improved B-scan images are obtained in an ultrasonic scanner by means of a phase insensitive imaging system. Backscattered signals are detected by a phased array of detector elements. Signals from each detector element are full wave rectified, low pass filtered and are nonlinearly processed by power law compression. The compressed signals are summed and then expanded by an inverse power law function.

5 Claims, 8 Drawing Figures

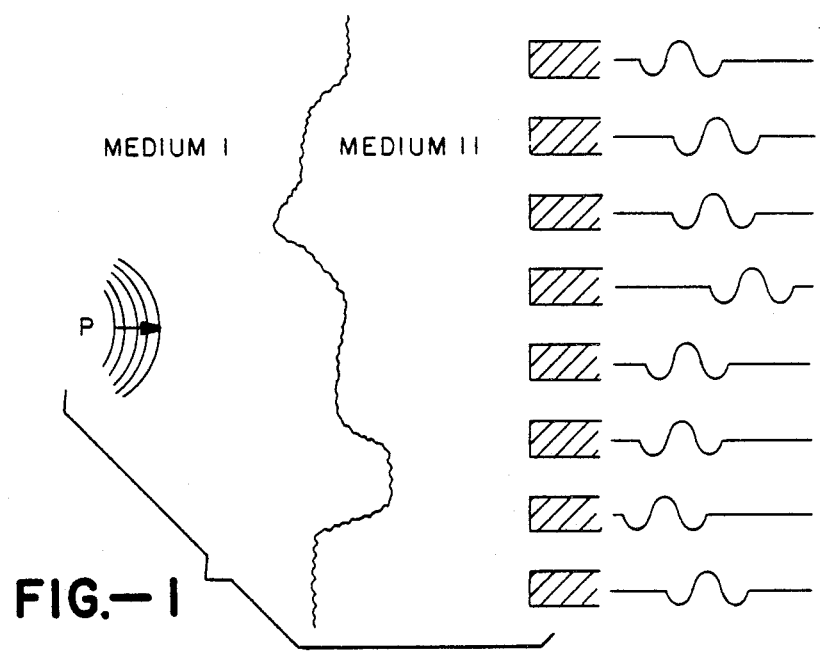
FIG.—1
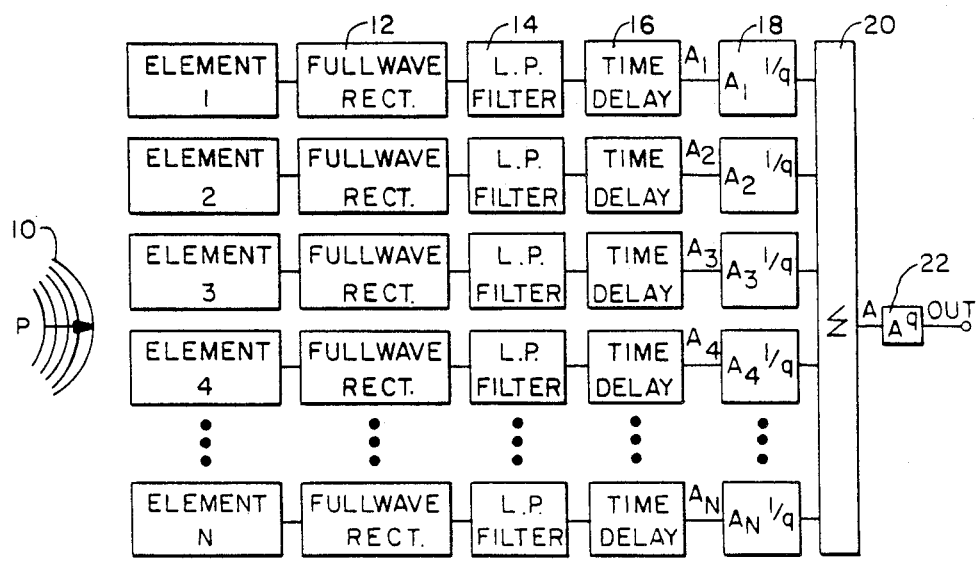
FIG.—4

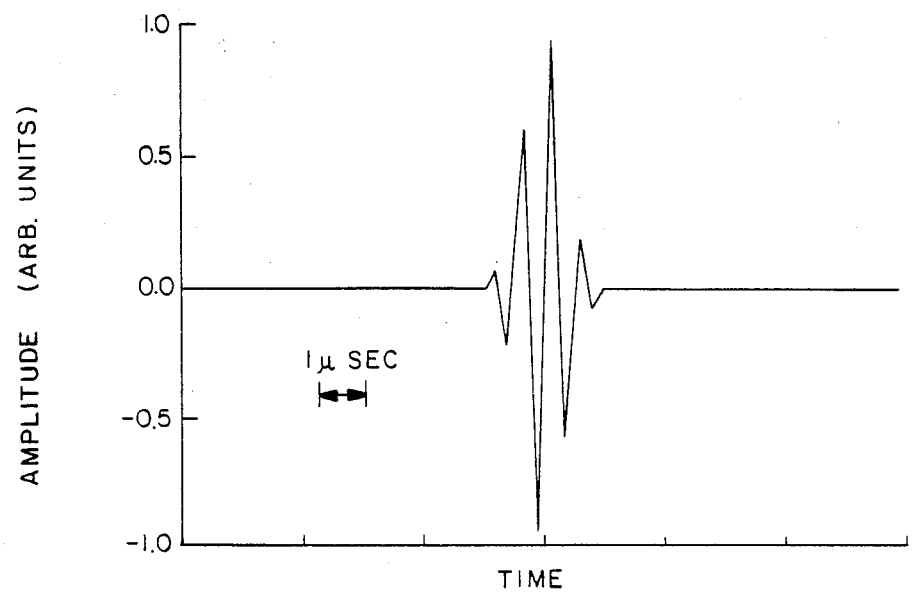
FIG.—5
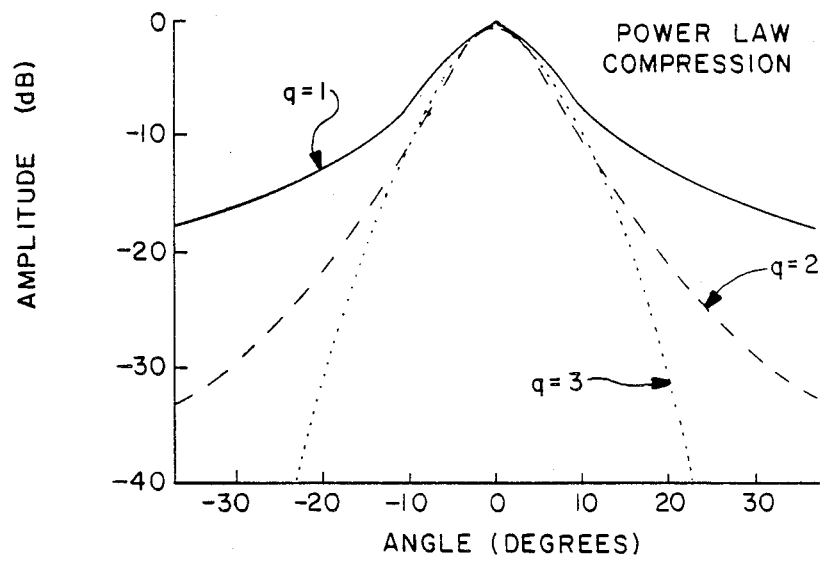
FIG.—6

PHASE INSENSITIVE DETECTOR FOR USE IN ULTRASONIC SCANNER AND METHOD

This invention relates generally to ultrasonic scanners and, more particularly, the invention relates to signal detection and processing circuitry for use in ultrasonic scanners.

Ultrasonic scanning systems are known and commerically available for medical diagnostic purpose. Such systems utilize sound transducers to transmit ultrasonic (e.g., on the order of several megahertz) waves into a patient and to receive echo signals. The echo signals are received by a phased array of detectors which conventionally use phase sensitive summation across the elements of the array to form a beam. The commercially available Datason ultrasonic system of General Electric Company provides both real time and static images on a television display.

Ultrasonic B-scan systems, whether static or real time, use coherent detection of backscattered signals to form the image. Spatial variation in the image of a uniform but inhomogeneous object is an inherent limitation of all coherent imaging systems. Because the spatial variation in coherent images often takes on a granular appearance, this effect is commonly referred to as speckle. Although image speckle is of random character, it is not random in the same sense as electrical noise.

In particular, if an object is imaged many times under exactly the same conditions, then the identical speckle patterns are obtained.

Although speckle can arise from a number of effects in coherent imaging systems, speckle in ultrasonic B-scan images seems to arise primarily from two sources. First, interference phenomena between multiple scatterers can result in fluctuations in the beam intensity. Second, the phase of the interrogating wave front can be distorted as it propagates to and returns from each point within the image plane. Due to the phase sensitive character of the transducer, these distortions result in phase cancellation effects across the aperture. The speckle characteristic of images compromised by phase cancellation effects often yield statistical measures more indicative of variations in propagation properties than of the properties of the scatterers. In contrast, the speckle associated with scatterer interference phenomena is directly related to the local distribution of scatterers. Consequently, phase cancellation artifacts must be minimized to ensure a close correspondence between image characteristics and scatterer properties.

In an attempt to minimize the effects of phase cancellation, phase-insensitive detection schemes have been proposed. However, all methods reported to date have resulted in detectors with large acceptance angles (i.e., poor resolution). Such detectors are incompatible with the needs of pulse-echo imaging.

An object of the invention is an improved method of and apparatus for phase insensitive detection and imaging in an ultrasonic scanner system.

A feature of the invention is the use of nonlinear processing of detected ultrasonic waves using power law compression and expansion.

Briefly, in accordance with the invention phase insensitive imaging in an ultrasonic scanner is realized by nonlinear processing of the outputs of a phased array detector. The signals detected by elements of the phased array of transducer elements are compressed, summed and then decompressed using power law functions.

In accordance with a preferred embodiment of the invention, an ultrasonic signal backscattered from a target is received by a phased array of transducer elements. The signal from each element is full wave rectified and low pass filtered, and then each rectified and filtered signal is time delayed to correct the particular arrival time function expected from the target. The delayed signal is then compressed by power law compression. Thereafter, all compressed signals are summed, and the sum is then decompressed using an inverse power law function.

Through use of power law compression, the output is relatively insensitive to small arrival time irregularities if the timing errors are less than the inverse of the bandwidth of the pulse. Further, the overall system remains linear. Additionally, there is a direct tradeoff between phase insensitivity and resolution for a given signal bandwidth.

The invention, and objects and features thereof, will be more readily addressed from the following detailed description and appended claims when taken with the drawing, in which:

FIG. 1 is an illustration of phase cancellation effects for an ultrasonic signal passing through inhomogeneous media.

FIG. 4 is a functional block diagram of an ultrasonic signal detector and processor in accordance with one embodiment of the present invention.

FIG. 5 is an illustration of an impulse response of an array element.

FIG. 6 is a plot received beam patterns from phase insensitive imaging system for several values of the order of the power law compression function in accordance with the invention.

Conventional phased array imaging systems utilize the property of phase sensitive summation across the elements of the array to form a beam. The relative phase of the individual array elements is controlled such that the phase sensitive sum approximates the diffraction integral across an aperture pointing to a particular direction and focused to a particular point. The quality of the beam produced in this way is directly related to the phase coherence from element to element along the array. Because of this need for phase coherence, conventional array systems are subject to severe artifacts in imaging highly inhomogeneous and irregular media such as tissue. This can be demonstrated using the simple illustration presented in FIG. 1. A target in medium I launches a backscattered wave that is detected by the array. The detected waves, however, have propagated from medium I through medium II, which has a different sound velocity than medium I. Due to the irregular shape of the boundary between the two media, the arrival time of the wave at each element is irregular. As a consequence, if the outputs of the array elements are phase adjusted to view point P, then the array elements are not in phase (i.e., not coherent).

To illustrate the effect of the inhomogeneous propagation on phase sensitive imaging systems, a computer model of the receiver section of a phased array sector scanned has been developed. This model includes the effects of inhomogeneous propagation by placing a single interface between the point target and the receiving array, as illustrated in FIG. 1, at a depth of 1 centimeter from the face of the array. The geometry of the interface was determined by a random number generator, and the velocity ratio between the two media was an input parameter of the model. The phase sensitive summation across the aperture was approximated by a baseband signal processing technique described by Engler and Tiemann in U.S. Pat. No. 4,155,260 for "Ultrasonic Imaging System." The imaging system was assumed to consist of a linear array of 40 transducers operating at a center frequency of 2.5 MHz, with aan interelement spacing of 0.25 mm. The bandwidth of the signal processing chain chosen so that the axial resolution of the imaging system is about 3 mm. All beam patterns were obtained by scanning the receiving electronics over a sector consisting of 112 beams separated by two-thirds of a degree.

Figure 2A:
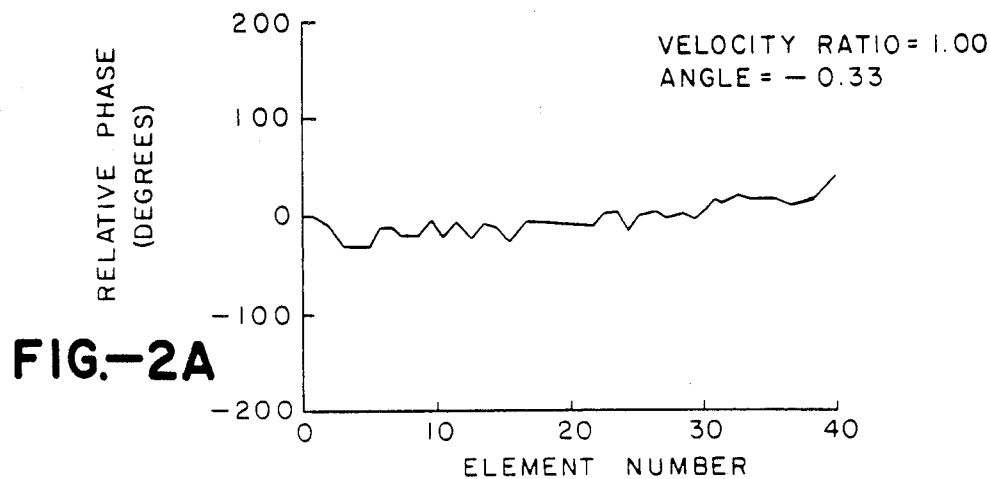
FIGS. 2A and 2B illustrate phase distribution across a detector array in the absence of and in the presence of tissue inhomogeneities.
Figure 2B:
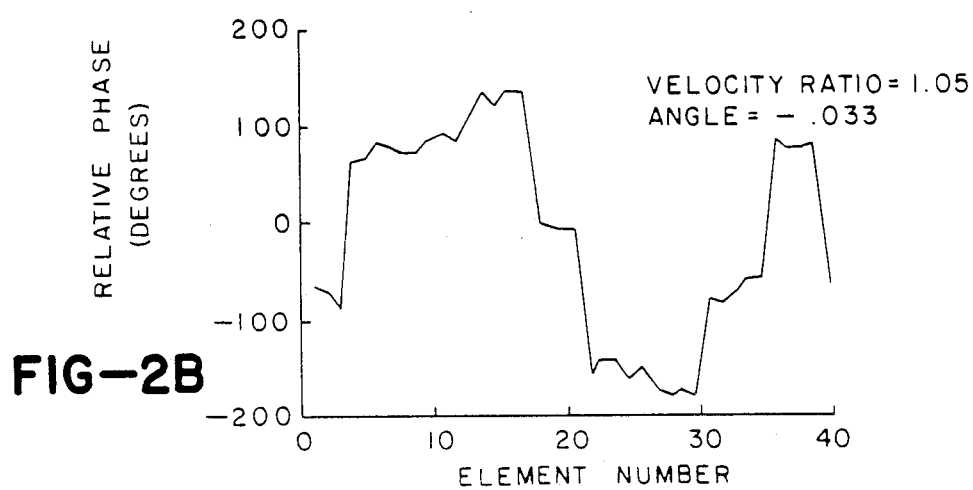

Because baseband processing is used, the instantaneous phase of the signal can be measured at each element by comparing the outputs of the I and Q demodulators. In FIGS. 2A and 2B, the relative phase across the aperture is illustrated for a point target positioned at a range of 10 cm and angle of 0°. The relative phase is defined as the phase difference between the output of any given element and the output of the center element. In this figure, the phase function across the aperture is presented for an image angle of −0.33° in the absence (FIG. 2A) and presence (FIG. 2B) of a velocity mismatch across the boundary. The results presented in the top panel illustrate the nearly flat phase function that is anticipated for this beam. In contrast, the results presented in the lower panel illustrate the phase distortion that results from inhomogeneous propagation.

Figure 3A:
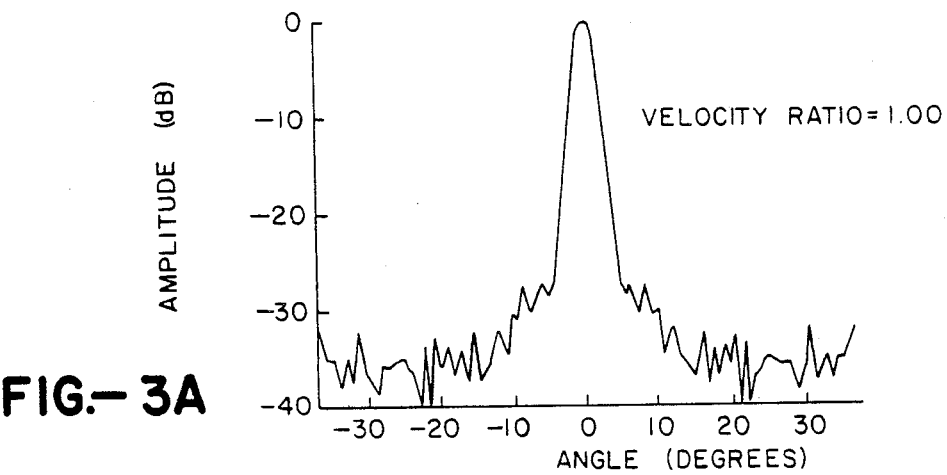
FIGS. 3A and 3B are received beam patterns in the absence of and in the presence of tissue inhomogeneities.
Figure 3B:
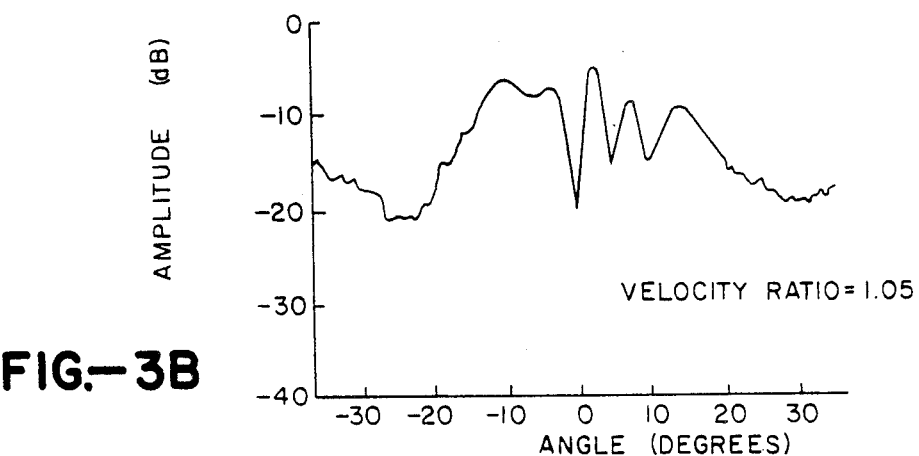

In the presence of phase distortions such as illustrated in FIG. 2B, the receive beam function of a phase sensitive imaging system can be severely compromised. FIGS. 3A and 3B present the beam function of the baseband imaging system for homogeneous (FIG. 3A) and inhomogeneous (FIG. 3B) propagation. The geometry of the boundary is the same as that used to generate the results presented in FIG. 2. As is evident from FIG. 3B, the imaging system is degraded for inhomogeneous propagation. In particular, the phase distortion generates multiple peaks in the receive beam pattern that will appear as multiple targets in an image (i.e., speckle).

In accordance with the present invention, phase insensitive imaging is realized by nonlinear processing of signals from the detector array elements. FIG. 4 is a functional block diagram of one embodiment of the invention, in which power law compression and expansion is utilized. Power law compression is defined as:

$$F(A) = A^{1/q}$$

or, $$\log (F(A)) = 1/q \log A.$$

In FIG. 4, the backscattered wave 10 from a target p is received by each of the element 1-n in a phased array. The signal from each transducer element is passed through a full wave rectifier 12 and a low pass filter 14. The rectified an filtered signal is then time delayed to correct for the particular arrival time function expected from the target to each element. The delayed signal is then compressed by power law compression at 18, and the compressed signals are then summed in summer 20. The summed signal is then decompressed using an inverse power law function at 22.

This compression scheme has a number of distinct advantages. First, the overall system remains linear. Second, power law compression circuits can be readily implemented. In addition, because the beam is formed using the detected output, the requirements on the time delays (i.e., time quantization) in the front-end electronics are greatly relaxed. Finally, this technique permits a direct tradeoff between resolution and phase insensitivity for a given bandwidth of the detected signal.

To illustrate the imaging capability of a system such as the one shown in FIG. 4, a computer model of a phase sensitive receiver has been developed. This model includes provisions for inhomogeneous propagation as described above. The computer model assumes that the impulse response of each array element is a Gaussian, as illustrated in FIG. 5. The detector section was modeled as a full wave rectifier followed by a single stage RC filter with a cutoff frequency of 2 MHz. This type of detection preserved the enveloped of the Gaussian pulse. In FIG. 6, the response of this system to a target at a range of 10 cm and an angle of 0°, is illustrated for several different values of the order of the power law compression. It will be noted that the beam pattern for q = 1 represents the receive response for purely additive processing. The time delay quantization was set to 150 nsec in the computer model to obtain these results. As anticipated, greater compression produces tighter beams. However, the beam character did not change appreciably for values of q greater than 8. Additional modeling studies showed that for a given signal bandwidth, the beam pattern improved as q increased until reaching a particular value. Beyond this "optimum" value, the beam character did not change significantly. The optimum value of the compression factor was directly related to the bandwidth of the unipolar pulse. Broader bandwidth pulses yielded a higher value for the optimum compression factor.

Computer modeling studies of phase insensitive imaging, in accordance with the present invention, have been undertaken and are discussed in General Electric Company Technical Information Series No. 82 CRD 137, dated May 20, 1982. Phase insensitive images of tissue phantoms are compared to conventional phase sensitive images of the same objects, and the results of the comparison show that the phase insensitive imaging reduces speckle in B-scan images. The computer modeling studies show that the technique reduces artifacts associated with phase distortions.

While the invention has been described with reference to a specific embodiment, the description is illustrative of the invention and is not to be construed as limiting the invention. For example, in the illustrated embodiment the phased array is a linear array. However, it will be appreciated by those skilled in the art that an annular phased array can be used in practicing the invention, with the signal processing being essentially the same, except for the annular array having time delays only for focusing. Thus, various modifications and applications may occur to those skilled in the art without departing from the true spirit and scope of the invention as defined by the appended claims.

What is claimed:

1. In an ultrasound scanning system, a method of phase insensitive processing of a backscattered signal comprising the steps of:
   (a) detecting said backscattered signals with a phased array of detector elements;
   (b) full wave rectifying and low pass filtering each detected signal;
   (c) time delaying each filtered signal as a function of expected travel time from a target to each detector element;
   (d) nonlinearly processing of each signal from each detector element by power law compression;
   (e) summing all nonlinearly processed signals; and
   (f) expanding the sum of all nonlinearly processed signals using an inverse of said power law compression.

2. The method as defined by claim 1 wherein said power law compression of a detected signal, A, is given by $$F(A) = A^{1/q}$$

where q is the order of the power law compression function.

3. A method of phase insensitive processing of signals detected by a phased array of detector elements comprising the steps of full wave rectifying and low pass filtering each detected signal, delaying each filtered signal as a function of expected travel time from a target to each detector element, nonlinearly processing the filtered and time delayed signals, summing said nonlinearly processed signals, and nonlinearly processing said sum of signals by a function which is the inverse of the nonlinearly processing of said output signals.

4. The method as defined by claim 3 wherein said step of nonlinearly processing said output signals is by power law compression.

5. For use in ultrasonic scanner systems, apparatus for phase insensitive processing of a backscattered signal comprising:
   (a) a phased array of detector elements for detecting said backscattered signal;
   (b) first processing means for receiving each signal from each detector element and compressing said each signal by power law compression, said first processing means including full wave rectification means for rectifying each signal from each detector element, low pass filter means for filtering each rectified signal, and time delay means for delaying each filtered signal as a function of expected travel time from a target to each detector element;
   (c) summing means for summing all compressed signals; and
   (d) second processing means for expanding said summed compressed signals by an inverse function of said power law compression.

* * * * *